April 14, 1970     W. J. BERLEYOUNG     3,506,511
METHOD OF SONIC WELDING

Filed June 5, 1967     3 Sheets-Sheet 1

INVENTOR.
WALTER J. BERLEYOUNG

BY
HIS ATTORNEYS

INVENTOR.
WALTER J. BERLEYOUNG
BY
HIS ATTORNEYS

April 14, 1970 W. J. BERLEYOUNG 3,506,511
METHOD OF SONIC WELDING
Filed June 5, 1967 3 Sheets-Sheet 3
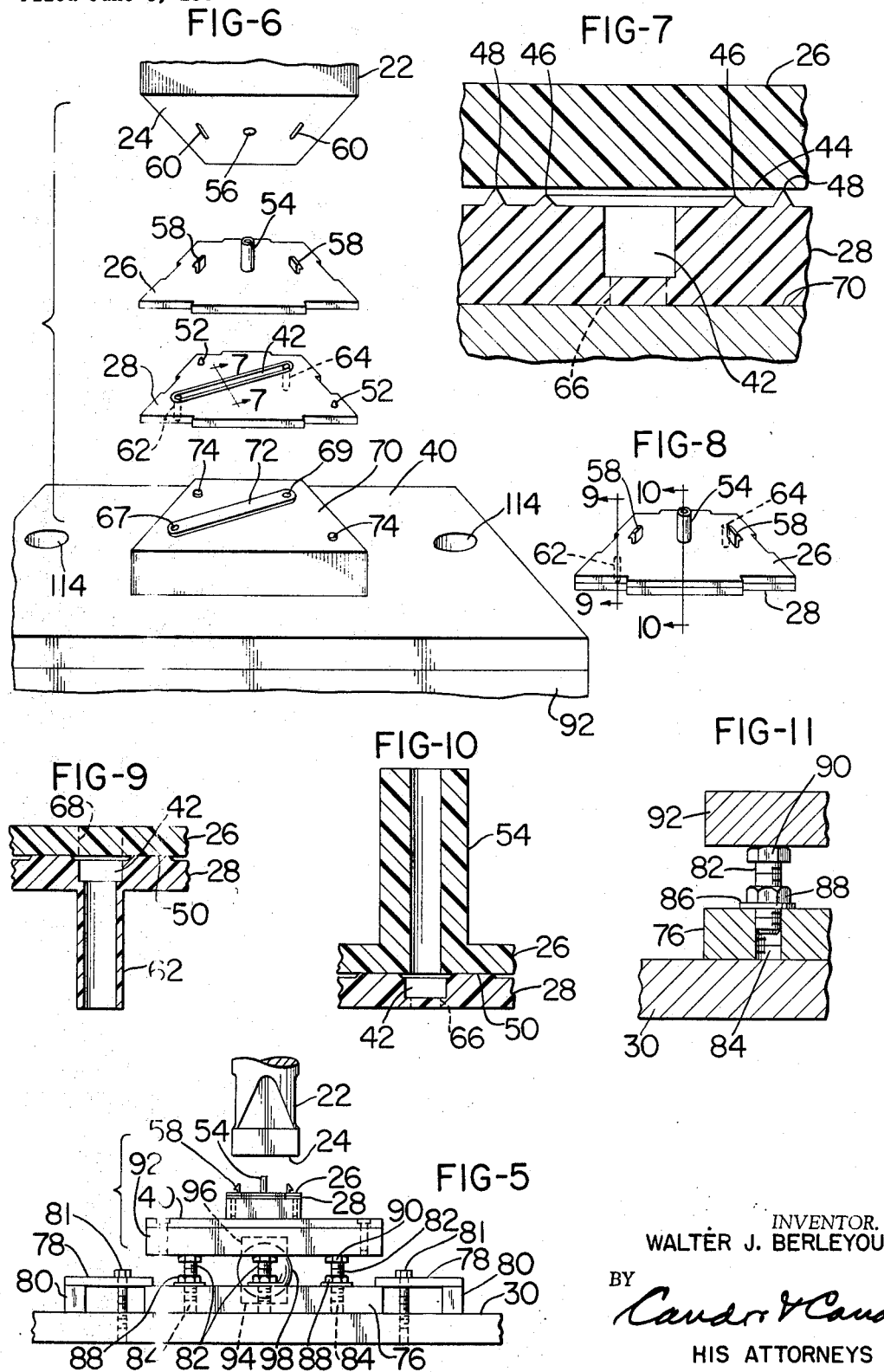
INVENTOR.
WALTER J. BERLEYOUNG
BY Candor & Candor
HIS ATTORNEYS United States Patent Office 3,506,511
Patented Apr. 14, 1970

3,506,511
METHOD OF SONIC WELDING
Walter J. Berleyoung, Goshen, Ind., assignor to Robertshaw Controls Company, Richmond, Va., a corporation of Delaware
Filed June 5, 1967, Ser. No. 643,716
Int. Cl. B29c 27/08
U.S. Cl. 156—73                                                    12 Claims

ABSTRACT OF THE DISCLOSURE

This application discloses an apparatus and method for sonically welding a plurality of thermoplastic relatively flat members or plates. A sonic signal producing element or horn presses and imparts welding sonic signals to one of the flat members. A holding fixture holds one or more of such flat members. A base supports the holding fixture, and universal supporting joint means are provided between the holding fixture and the base. Such universal supporting joint means may include a relatively large spherical ball which is received in recesses in the holding fixture and in the base. This construction equally distributes the main part of the force of the horn over the entire surface of the parts to be welded together between the flat members or plates.

---

This invention relates to self-adjusting apparatus and method for sonic welding.

One of the features of this invention includes sonic welding apparatus and method for sonically welding a plurality of thermoplastic relatively flat members or plates by means of a signal producing element which imparts welding sonic signals to one of such flat members or plates, a holding fixture to hold one or more of such flat members or plates, and automatic means automatically to distribute a main part of the force of said sonic signals to the parts of said flat members or plates to be sonically welded together. Such automatic means may include a base to support said holding fixture, and universal supporting joint means between said holding fixture and said base.

Another feature of this invention includes a large spherical ball or the like for providing said universal supporting joint means of this invention.

Another feature of this invention includes a plurality of adjustable rocking movement limiting members for limiting the rocking movement produced by the universal supporting joint means.

Another feature of this invention includes an adjustable turning movement limiting means for preventing or limiting the turning movement around the universal supporting joint means.

Other features of this invention are apparent from this description, the appended claimed subject matter, and/or the accompanying drawings in which:

FIGURE 5 is a diagrammatic elevation of FIGURE 4.

FIGURE 6 is an exploded view showing a typical horn, typical plates to be welded and a typical holding die.

FIGURE 7 is a cross section through the typical plates of FIGURE 6, substantially along the line 7—7, and showing the two plates closely together before any welding action has taken place.

FIGURE 8 is a perspective view showing the plates of FIGURE 6 welded together.

FIGURE 9 is an enlarged diagrammatic cross section along the line 9—9 of FIGURE 8.

FIGURE 10 is an enlarged diagrammatic cross section along the line 10—10 of FIGURE 8.

FIGURE 11 is an enlarged cross section showing one of the adjustable screws which limit the rocking action of the supporting fixture.

Certain words may be used in this specification and claimed subject matter which indicate direction, relative position, and the like. These words are used for the sake of brevity and clearness. However, it is to be understood that such words are used only in connection with the various views of the drawings, and that, in actual use, the parts so described, may have entirely different direction, relative position, and the like. Examples of such words are "vertical," "horizontal," "upper," "lower," etc.

Figure 1:
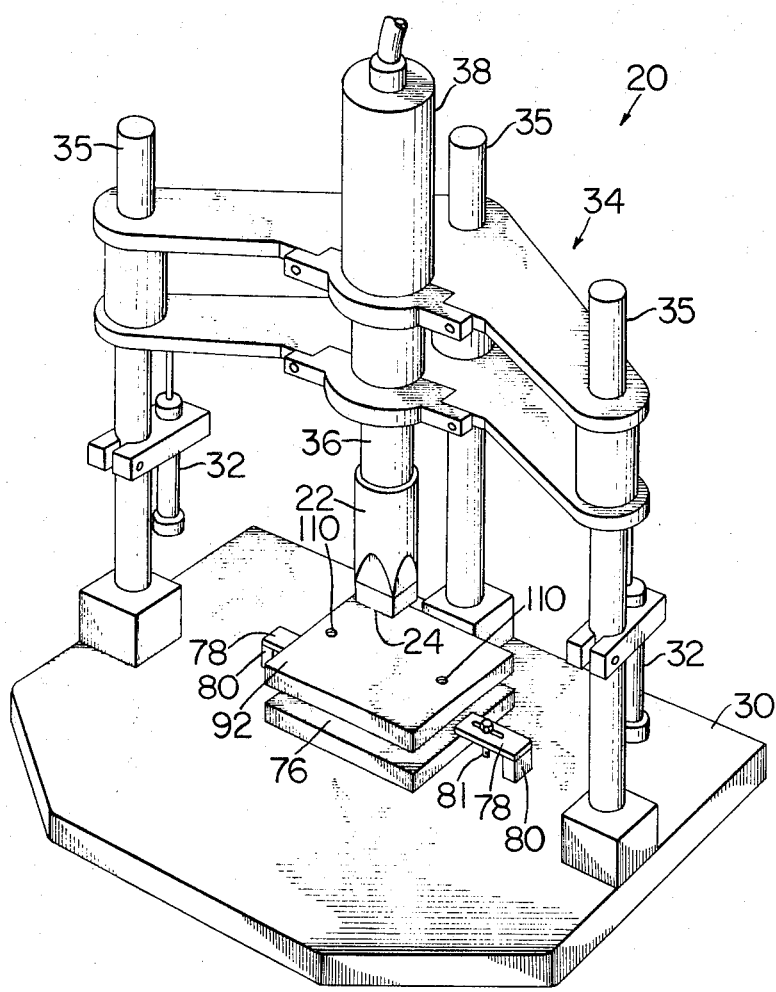
FIGURE 1 is a perspective view of a sonic welding apparatus for welding and performing a method of sonically welding various parts of a plurality of thermoplastic members.

FIGURE 1 shows a sonic welding apparatus 20 which may be used for sonically welding a plurality of thermoplastic relatively flat members or plates according to this invention. This apparatus 20 may be quickly adjusted to operate on a large number of different banks or assemblies of a plurality of thermoplastic, relatively flat members or plates. Such apparatus 20 is adapted sonically to weld quickly a plurality of thermoplastic, relatively flat members or plates to form a plurality of identical banks or assemblies of such flat members or plates, or sonically to weld a plurality of flat members or plates into a plurality of entirely different banks or assemblies, as desired.

For example, it may be desired repeatedly to weld a plurality of members or plates to form a plurality of identical banks or assemblies of such members or plates relatively quickly. This apparatus 20 quickly adjusts itself, so that such members or plates are quickly received and quickly sonically welded together to form such identical banks or assemblies of welded flat members or plates. On the other hand, it may be desired to produce a plurality of different banks or assemblies of such flat members or plates, in which case the apparatus may be quickly modified or adjusted repeatedly to produce such different banks or assemblies of flat members or plates in a manner more fully to be disclosed.

The apparatus 20 may include a signal producing element or horn 22 having means 24 to press and impart welding sonic signals to one relatively flat member or member or plate 26 of a plurality of relatively flat members or plates 26 28, and the like, to weld certain parts of the plates 26 and 28 together.

Certain parts of the apparatus 20 may be purchased, for example, from Branson Instruments, Inc., which has a place of business at Danbury, Conn., or from some other similar supplier of such equipment. Such purchased apparatus 20 may then be modified to have the form and operation of this invention.

The parts of the apparatus 20 which may be purchased or obtained from such suppliers may include a base or pedestal 30 which supports the sonic welding horn 22, so that such horn may be moved vertically by suitable hydraulic or pneumatic cylinders 32 which raise and lower a supporting platform construction 34 on posts 36. The platform 34 carries a horn supporting shaft 36, a sonic power unit 38, which may be connected to a power supply unit, not shown, but well known.

Figure 4:
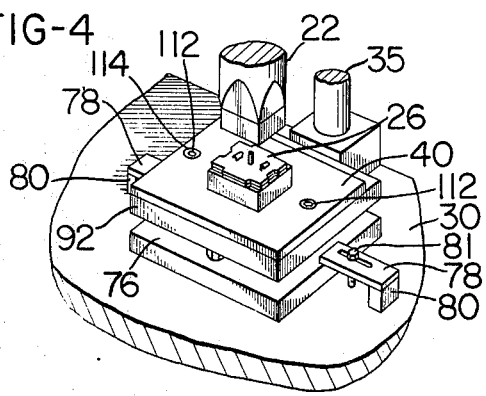
FIGURE 4 is a view of a portion of FIGURE 1, with a holding die added to form a part of the holding fixture.
Figure 2:
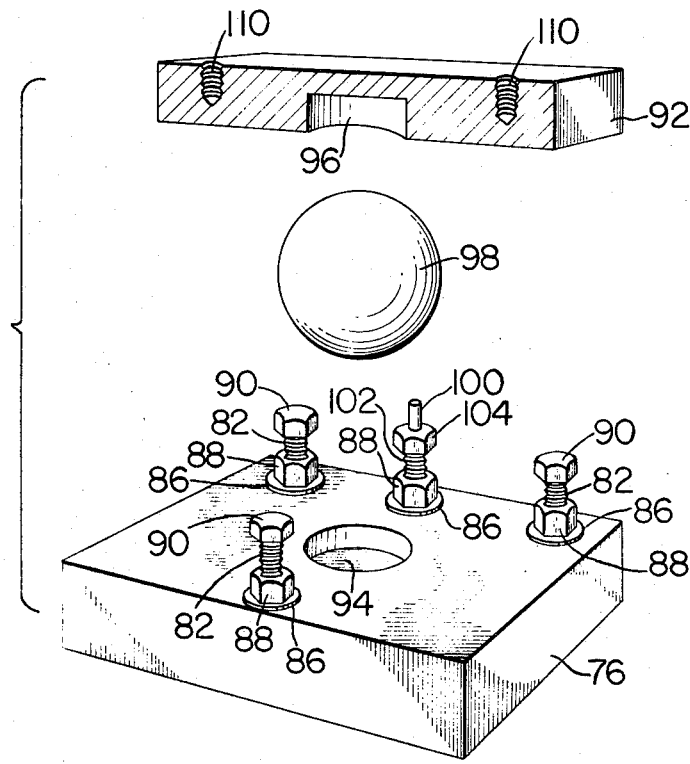
FIGURE 2 is an exploded view showing portions of the base plate, universal joint ball and holding fixture.

The horn 22 is readily secured to and readily removed from the shaft 36. The horn 22 may be tailored by the supplier in accordance with the design or request of the user to match the article to be contacted. To operate on the plates 26 and 28 such horn may be provided with a relatively large contact area under surface or face 24 which is adapted to engage a large area of the upper plate 26 when the horn 22 is lowered into sonic welding position. The plurality, or pair of plates 26 and 28, are placed together on top of the welding support die 40, FIGURES 4, 5 and 6, and then the horn is brought into welding engagement with the top of the plate 26, and sonic signals are produced in and by the horn 22 to produce the sonic welding operation to be described.

The words "sonic" and "ultrasonic" and derivatives thereof are intended to be used interchangeably herein to describe vibrations of the character suitable for performing the welding operation of this invention. For example, typical frequencies may have a range of from 4,000 to 20,000 vibrations per second, more or less.

The flat members or plates, such as 26 and 28, herein disclosed, are merely illustrative of the many different kinds of plates or flat members that are capable of being sonically welded by this invention. For example, such plates may have one or more channels 42 which may be covered and sealed by the under surface 44 of the plate 26. To accomplish this, one or more ridges 46 and 48, FIGURE 7, may be formed to surround the channel 42, so that such ridges are melted during the sonic welding operation and are formed into sealing and holding bands 50, FIGURES 9 and 10, which seal the sides of the channels 42 and hold the plates 26 and 28 together. However, this is merely illustrative of the many local welds that may be made between the flat members or plates.

If desired, suitable cones 52 may be added to plate 28 to seal together the plates 26 and 28 at places where they are not sealed together by the bands 50. The cones 52 may be substantially of the same cross section as shown for the ridges 46 and 48. This also is merely illustrative of other local welds to be produced.

The following details concerning the plates, channels, etc., are given merely to illustrate and give proper background of this invention.

The plates 26 and 28 may be made of thermoplastic material suitable for the sonic welding operations herein described. Such thermoplastic material may be readily selected by anyone skilled in the art. For example, the plates 26 and 28 may be injection molded, in suitable molds, of Dupont Lexan plastic, or any of the many similar plastic materials available on the market and readily selected by those skilled in the art. The ridges 46 and 48 may be in the order of 60 degrees and 90 degrees, as to the angle between their sides and may have a cross section that forms an equilateral angle.

The plates 26 and 28 may be of any desired size, such as 2″ wide along the edges. The channels 42 may be .031″ wide and .031″ deep, more or less. The outer, higher ridges 48 may be from .066″ to .088″ high, more or less, and .120″ between the two higher ridges 48, more or less. The lower ridges 46 may be from .004″ to .006″ high, more or less, and may be .082″ between the two lower ridge tops. The thickness of the plates 26 and 28 may be, as proportionally shown, with respect to the depth of the channel 42, or they may be of any other proper width, as desired.

The plate 26 may have an upward integral tube 54 which is connected to the channel 42 and enters, and is not pressed, by the opening 56 in the face 24. The plate 26 may have two integral upward hook members 58, which are not to be welded, and are not necessarily material to this invention, and which enter and are not pressed by the upward slots 60 in the face 24. The plate 28 may have two integral downward tubes 62 and 64, which are connected to the channel 42, and which enter and are not pressed by the openings 67 and 69 on the welding support die 40. After the welding operation, the tube 54 may be sealed to the central part of the channel 42, as shown in FIGURE 10, and the channel 42 may be connected to the downward tube 62, as shown in FIGURE 9, and to the tube 64, at the other end of the channel. In this manner air or other fluid may be caused to flow by and between the tubes 54, 62, 64, and any other tubes or openings desired. The channel 42 may have downwardly and upwardly directed openings 66 and 68 at any desired places.

It is to be understood that all of these details in plates 26 and 28 are merely illustrative, to show that such plates may be welded togther for any purpose, to produce fluid flow passageways and the like with or without tubes or openings, as desired. Many other different types of plates may be used instead of the ones illustrated.

To produce the desired sonic welding action between the relatively flat members or plates 26 and 28 it is necessary that a relatively large surface area contact be established between the upper surface of plate 26 and face 24 of horn 22 to prevent any welding or melting action between these surfaces. It is also necesary that a main part of the force of the sonic signals from horn 24 be equally distributed and concentrated at the relatively small areas of the ridges 46, 48 and cones 52 between the plates 26 and 28. Also a relatively large, unconcentrated area must be maintained between the face 70 of the welding support die 40 and the under surface of the plate 28. This is provided by the very slightly raised wide area flat portions 72 and 74 of the face 70. These portions 72 and 74 concentrate the main pressing and welding action at the ridges 46, 48 and cones 52 between the plates 26 and 28.

In order to make these channels, tubes, and the like, substantially sealed between and in the plates, and to join the plates herein disclosed with other plates, to form other assemblies or banks, it is necessary that the face 24 of the horn 22 and the face 70 of the welding support die 40 be parallel to each other during the sonic welding operation. According to this invention, this parallelism is automatically obtained very time that two or more plates are placed between the faces 24 and 70, repeatedly to produce a plurality of identical banks or assemblies quickly, one after the other, without having to carefully shim the welding support die 40 to obtain the parallelism. Also, according to this invention, it is possible to quickly change the horn 22, and the supporting die 40, to receive other and different thermoplastic members or plates, and to weld them together to produce different banks or assemblies of flat members or plates, and quickly to repeat production of such different banks or assemblies as will become apparent. According to this invention, the arrangement is such that the faces 24 and 70, or similar faces of other horns and dies, will quickly become parallel automatically during each sonic welding operation. Also the arrangement is such that other different horns, similar to horn 22, and other different support dies, similar to support die 40, may be quickly substituted to change the apparatus 20 to receive and sonically weld other different but somewhat similar banks or assemblies of such flat members or plates.

Thus means are provided automatically to distribute a main part of the force of the mainly lateral sonic signals to the parts of the flat members or plates to be sonically welded together. To this end the base plate 76 is secured tightly on the base 30 by any suitable means. For example, fastener bars 78 have their ends held respectively on the base plate 76 and on two blocks 80, which rest on the base 30. These fastener bars are held down by the screws 81, which are screwed into tapped holes in the base 30. This construction securely holds the base plate 76 on the base 30. A plurality of rocking movement-preventing screws 82 are screwed into tapped openings 84 and are held in adjusted position by the lock washers 86 and lock nuts 88. For example, three such screws may be provided on the base plate 76, each screw having a rocking movement preventing head 90, which may have its top slightly rounded. These three screws 82 are threadedly adjusted and locked in place so that the three heads 90 are normally only slightly spaced from the bottom of a rocker plate 92 and permit only a slight rocking movement in such rocker plate 92.

The plates 76 and 92 are provided with universal joint means between them. To this end they are provided respectively with ball receiving receses or openings 94 and 96. The large spherical ball 98, which may be made of steel, is placed partly in the recesses 94 and 96 and between the plates 76 and 92, rockingly to support the rocking plate 92.

Means are provided to prevent any turning movement of the rocker plate 92 with respect to the base plate 76. Such means may include a pin 100 held by an adjustable screw 102, which may be secured to the base plate 76 substantially in the same manner as are the screws 82, by means of a similar lock washer 86 and a similar lock nut 88. The head 104 may be adjusted below the level of the heads 90 of the screws 82, so that the head 104 does not interfere with the rocking movement of the plate 92.

Figure 3:
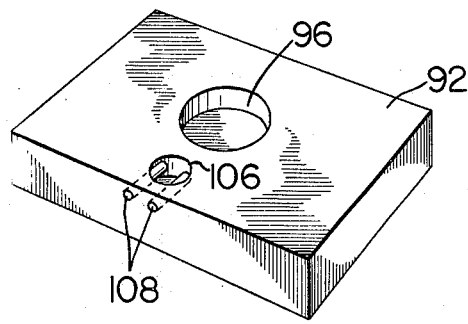
FIGURE 3 is a bottom view of the holding fixture rocker plate shown in FIGURE 1.

An orifice or recess 106, FIGURE 3, is provided on the bottom side of the plate 92 and a pair of pins or screws 108 are driven and locked in the side of the plate 92, so that they extend into the recess 106. These pins 108 are spaced from each other in a manner sufficiently snugly to receive the pin 100, in a manner to allow the plate 92 to rock without any substantial turning movement around the universal joint means.

The plate 92 is provided with tapped openings 110 into which screws 112 are threaded. The screws 112 pass through openings 114 in the die 40 and have heads which hold the die 40 securely in place on top of the plate 92. Any desired number of openings 110, 114, and screws 112 may be provided.

It is thus to be seen that a sonic welding apparatus and method for sonically welding a plurality of thermoplastic relatively flat members or plates have been provided. The signal producing element 22 has a means, or face 24, to press and impart welding sonic signals to one of the flat members or plates, such as 26, of a plurality of flat members or plates 26, 28. A holding fixture is provided, including the support die 40 having means 70 to hold one or more of the flat members or plates 26 and 28, and automatic means have been provided automatically to distribute a main part of the force of the sonic signals sonically to weld the parts of the flat members or plates desired to be welded.

A new and useful apparatus and method are thus provided for sonically welding such plurality of thermoplastic relatively flat members or plates.

While the form of the invention now preferred has been disclosed, as required by statute, other forms may be provided, all coming within the scope of the claims which follow.

What is claimed is:

1. A method of sonically welding a plurality of thermoplastic relatively flat members comprising, pressing a sonic signal producing element against at least one of said flat members, imparting welding sonic signals to at least one of said flat members by said pressing signal producing element which is connected to the holding fixture so that pressing with said element will cause coaction between said element and said fixture, holding at least one of said flat members by said holding fixture, and automatically causing said holding fixture and said signal producing element to align themselves relative to each other and maintaining such alignment with said flat members therebetween by said pressing step to distribute a main part of the force of said sonic signals to the parts of said flat members to be sonically welded together.

2. A method according to claim 1, with said method welding a plurality of flat members which are thermoplastic plates, with said signal producing element having a generally flat face to press against and impart sonic signals to one of said plates, with said holding fixture having a generally flat face to hold at least one of said plates, and with said force of said sonic signals being automatically distributed to the parts of said plates to be welded together by said alignment of said fixture and said element causing said flat faces to be automatically aligned substantially parallel to each other while said plates are being welded together.

3. A method according to claim 3 said holding fixture is supported by a base having universal supporting joint means between said holding fixture and said base to cause said holding fixture to align itself relative to said pressing element with said flat members therebetween.

4. A method according to claim 3 with said method welding a plurality of flat members which are thermoplastic plates, with said signal producing element having a generally flat face to press and impart sonic signals to one of said plates, and with said holding fixture having a generally flat face to hold at least one of said plates.

5. A method according to claim 3 including the step of providing said at least signal producing element with a generally flat signal imparting face and engaging one of said flat members with said face, and providing said holding fixture with a generally flat holding face, and holding said one or more of said flat members on said holding face.

6. A method according to claim 5 including the step of maintaining said faces substantially parallel to each other by said universal supporting joint means.

7. A method according to claim 3 including the step of limiting rocking movement between said holding fixture and said base by adjustable rocking movement limiting means.

8. A method according to claim 3 including the step of providing using a plurality of adjustable screws in said adjustable rocking movement limiting means for limiting said rocking movement.

9. A method according to claim 8 including the step of providing screw heads on said adjustable screws for limiting said rocking movement.

10. A method according to claim 3 including the step of limiting turning movement between said holding fixture and said base by turning movement limiting means.

11. A method according to claim 10 including the step of providing a pin and orifice construction in said fixture and base to limit said turning movement.

12. A method according to claim 11 including the step of supporting said pin on said base and providing said orifice in said fixture.

References Cited

UNITED STATES PATENTS

| | | | |
|---|---|---|---|
| 3,146,141 | 8/1964 | Woodland | 156—580 XR |
| 3,365,349 | 1/1968 | Danials | 156—580 |
| 3,419,447 | 12/1968 | Hewitt | 156—580 XR |

BENJAMIN R. PADGETT, Primary Examiner

A. J. STEINER, Assistant Examiner

U.S. Cl. X.R.

156—580